(12) United States Patent
Filippov et al.

(10) Patent No.: US 8,433,168 B2
(45) Date of Patent: Apr. 30, 2013

(54) ACTIVE OPTICAL FIBER AND METHOD FOR FABRICATING AN ACTIVE OPTICAL FIBER

(75) Inventors: Valery Filippov, Tampere (FI); Yuriy Chamorovskiy, Fryazino (RU); Oleg Okhotnikov, Tampere (FI); Markus Pessa, Tampere (FI)

(73) Assignee: Optoelectronics Research Center, Tampere University of Technology (FI)

( * ) Notice: Subject to any disclaimer, the term of this patent is extended or adjusted under 35 U.S.C. 154(b) by 409 days.

(21) Appl. No.: 12/681,480

(22) PCT Filed: Sep. 29, 2008

(86) PCT No.: PCT/FI2008/050540
§ 371 (c)(1),
(2), (4) Date: Apr. 2, 2010

(87) PCT Pub. No.: WO2009/043968
PCT Pub. Date: Apr. 9, 2009

(65) Prior Publication Data
US 2010/0247047 A1    Sep. 30, 2010

(30) Foreign Application Priority Data
Oct. 3, 2007 (WO) .................. PCT/FI2007/050540

(51) Int. Cl.
*G02B 6/036* (2006.01)
(52) U.S. Cl.
USPC ............................. 385/127; 385/43; 385/126
(58) Field of Classification Search .......................... None
See application file for complete search history.

(56) References Cited

U.S. PATENT DOCUMENTS 5,138,676 A * 8/1992 Stowe et al. .................... 385/32
5,290,398 A * 3/1994 Feldman et al. ................ 216/11
(Continued)

FOREIGN PATENT DOCUMENTS

JP    9-227149       9/1997
JP    2002-270928 A  9/2002
(Continued)

OTHER PUBLICATIONS

W.L.R. Perera et al.; "Down-Tapered Double-Clad Fibre for Diode Array Pumped Lasers and Amplifiers" 20th Australian Conference on Optical Fibre Technology (ACOFT); pp. 216-219; Dec. 3-6, 1995.

(Continued)

*Primary Examiner* — Mike Stahl
(74) *Attorney, Agent, or Firm* — Studebaker & Brackett PC; Donald R. Studebaker (57) ABSTRACT

A section of active optical fiber (11) which comprises an active core (1), an inner cladding layer (2) and an outer cladding layer (3). The diameter of said core 1) and the thickness of said inner cladding (2) change gradually along the length of said section of active optical fiber (11). This forms tapered longitudinal profile enabling a continuous mode conversion process along the length of the section of fiber (11). The method for fabricating a section of tapered active optical fiber comprises the steps of fabricating a preform for drawing active optical fiber from said preform, installing said preform into a drawing tower, drawing optical fiber in said drawing tower and altering at least one of the two parameters including the take-off preform speed and the take-up fiber speed during drawing of the optical fiber.

13 Claims, 7 Drawing Sheets

U.S. PATENT DOCUMENTS

| | | | |
|---|---|---|---|
| 5,707,564 A * | 1/1998 | Rivoallan | 264/1.24 |
| 6,233,387 B1 * | 5/2001 | Berkey et al. | 385/123 |
| 6,324,326 B1 | 11/2001 | Dejneka et al. | |
| 6,842,570 B2 * | 1/2005 | Komine | 385/43 |
| 7,526,165 B2 * | 4/2009 | Nielsen et al. | 385/125 |
| 2002/0094159 A1 | 7/2002 | Goldberg et al. | |
| 2006/0219673 A1 | 10/2006 | Varnham et al. | |
| 2006/0280217 A1 | 12/2006 | Zervas et al. | |
| 2008/0050069 A1 * | 2/2008 | Skovgaard et al. | 385/39 |
| 2011/0060488 A1 * | 3/2011 | Nakazawa | 701/22 |
| 2011/0235658 A1 * | 9/2011 | Pocholle et al. | 372/6 |
| 2012/0127563 A1 * | 5/2012 | Farmer et al. | 359/341.3 |
| 2012/0262781 A1 * | 10/2012 | Price et al. | 359/341.3 |

FOREIGN PATENT DOCUMENTS

| | | |
|---|---|---|
| JP | 2007-250951 A | 9/2007 |
| WO | 92/10014 | 6/1992 |

OTHER PUBLICATIONS

H. Jeong et al.; "Continuous wave single transverse mode laser oscillation in a Nd-doped large core double clad fiber cavity with concatenated adiabatic tapers"; Optics communications; vol. 213; pp. 33-37; 2002.

J.D. Minelly et al.; "High power diode pumped single-transverse-mode Yb fiber laser operating at 978 nm"; Optical Fiber Communication Conference, Baltimore, MD; vol. 4; pp. 172-174; 2000.

T. Ritari; "International Search Report"; PCT/FI2008/050540; Jan. 29, 2009.

\* cited by examiner

POWER LAW FUNCTION LONGITUDINAL TAPERING PROFILE

EXPONENTIAL FUNCTION LONGITUDINAL TAPERING PROFILE

ACTIVE OPTICAL FIBER AND METHOD FOR FABRICATING AN ACTIVE OPTICAL FIBER

FIELD OF THE INVENTION

The present invention relates to active optical fibers, optical fiber amplifiers and optical fiber lasers.

BACKGROUND OF THE INVENTION

Double clad active optical fibers are widely used in fiber lasers and amplifiers. Fiber lasers and amplifiers with a CW output power of up to several kilowatts have been demonstrated. Besides to the obvious advantages the known double clad active optical fibers have serious shortcomings.

Firstly, there is a limitation on the level of pump power that can be launched into a double clad fiber. This consequently limits the power scaling capability of fiber lasers and amplifiers. Furthermore in single mode fibers the fundamental mode propagation requirement imposes restrictions on the largest core diameter. This requirement dictates that even for fibers with a small numerical aperture (NA<0.07) a core diameter should not exceed 12 μm for an operational wavelength of 1 μm. At the same time, since pump absorption in a double clad fiber depends on the core/cladding diameter ratio, the outer diameter of a double clad fiber should not exceed 300-400 μm. Taking into account the limited brightness of available pump sources, the limitation in the fiber diameter automatically leads to a limitation in the output power of an active component.

Secondly, the pump absorption coefficient for each cladding propagated mode is determined by the overlap between the mode field distribution and the dopant (e.g. rare earth ions) distribution in the core. As a result, each mode will be absorbed with different efficiency due to a difference in the mode field distribution of various modes. So, virtually, it is possible to divide all cladding propagated modes into two groups—"absorbable" and "unabsorbable" modes.

The first group of modes has an axially symmetrical mode field distribution. These are the modes with a maximum intensity at the doped core, i.e. in the centre of the fiber and, as a result, these modes are well absorbed and contribute very much to light amplification. The second group of modes, that still contains an essential fraction of the pump power, has a small overlap integral with the core and the dopants. Therefore the modes in this group are not absorbed efficiently in the core of the fiber and do not notably contribute to light amplification.

In terms of ray optics, the "absorbable" modes can be understood as meridian rays which propagate along the fiber crossing an optical axis of the fiber i.e. the doped core. The "unabsorbable" modes can be understood as skew rays. These skew rays have a spiral trajectory and are still guided by the inner cladding of the double clad fiber, but propagate without crossing the doped core.

Figure 1:
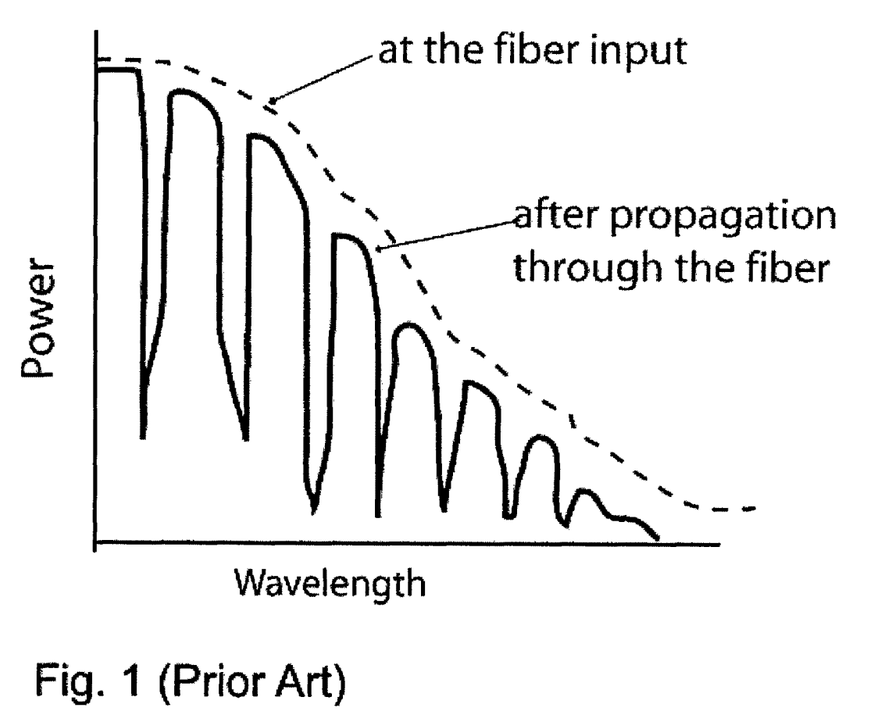

Typically pump absorption occurs according to the following scenario. The first group of modes, the meridian rays, are absorbed very quickly as they propagate along the length of the fiber. The rest of the pump radiation concentrated mostly into the skew rays propagates practically without any absorption. The modal spectrum for pump radiation before and after propagation through a double clad fiber is shown in FIG. 1. Since the different modes have significantly different absorption the modal spectrum changes dramatically as light propagates along the fiber; spectral "holes" are burned into the spectrum. The modal spectrum begins to stabilize after the "absorbable" modes have undergone significant absorption.

The non-uniform distribution of population inversion along the fiber length is largely a result of the change in modal content of the pump radiation with propagation distance. The part of an active fiber which has an insufficient inversion, works as an absorber. This causes deterioration in the pump conversion efficiency of lasers and amplifiers.

Figure 2:
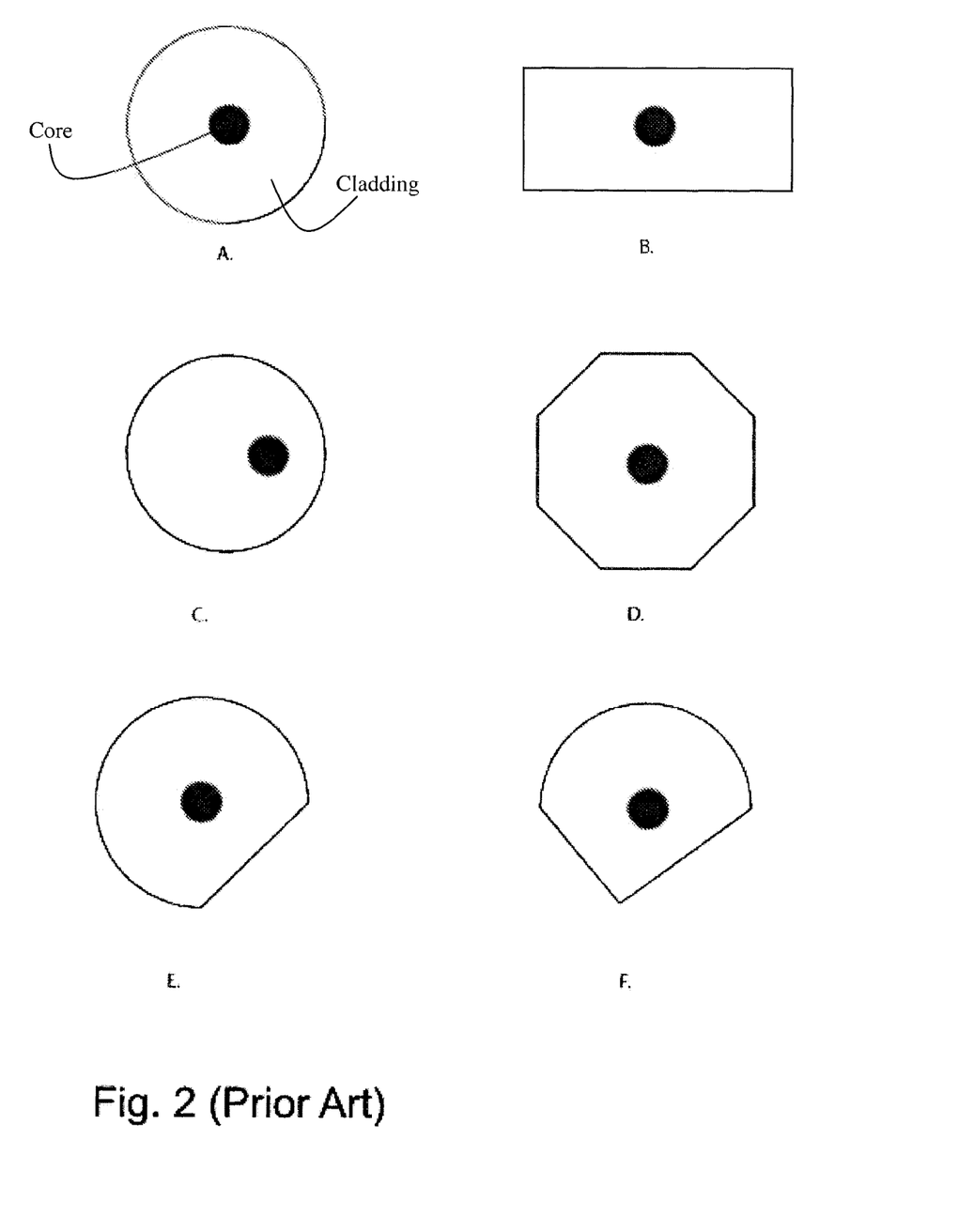

There are three main approaches for improving the limited pump absorption in a double clad fiber. The first one uses fibers with a special shape of cladding. The cross-section of the cladding can be e.g. truncated, double truncated, rectangular, hexagonal or decagonal and the fiber can have a core offset from the middle of the fiber (FIG. 2). The special shape of the cladding or an offset core enriches the modal spectrum as the rays' propagation trajectories become more chaotic. This makes the modal spectrum of the fiber more continuous. As a result, a bigger part of the total pump power is concentrated in the "absorbable" modes of the modal spectrum compared with a circular symmetric fiber. The reason for low absorption of the pump power into the active core is the regularity of the fiber, i.e. the fact that the mode spectrum is the same for all parts of the fiber. It is known from prior-art that a special geometry of the cladding leads to an increase in the pump power absorption, but by no means completely eliminates the problem of saturation of the absorption.

Figure 3:
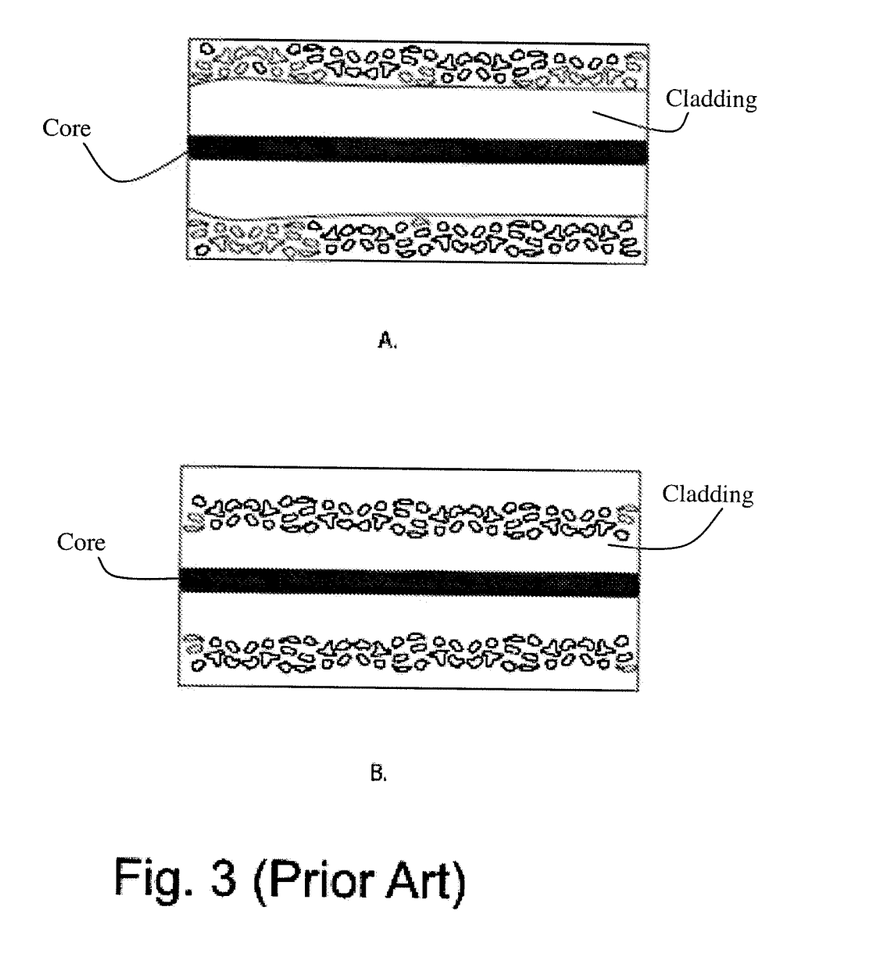

The second approach exploits non-regular bending of the fiber introduced by granular matter such as sand, metal, ceramic or plastic particles embedded into the fiber coating. The periodic non-regular stresses and bending cause a mode coupling, which, in turn, leads to transfer of part of the optical power from skew rays ("unabsorbable" modes) to meridian rays ("absorbable" modes) (FIG. 3a). Although, the non-regularity may improve the absorption of pump power, this effect strongly depends on the fiber geometry. As it is known, the mode coupling coefficient D is strongly dependent on the outer diameter of the fiber:

$$D \propto d^8/b^6 \lambda^4, \qquad (1)$$

where d is the core diameter, b is the fiber's outside diameter and λ is the operational wavelength.

As we can see from (1), the mode coupling coefficient for fibers with a large diameter (300-500 μm) is extremely low. Furthermore this method is applicable only for relatively thin fibers with an outer diameter of cladding of less than 200 μm, because it is difficult to bend a 300-600 μm diameter fiber with the required spatial period. Additionally, a chaotic mechanical stress and perturbation of cladding may lead to the coupling between skew and leakage rays resulting in an increase in the loss of pump power. This would lead to deterioration in the efficiency of an active component.

The third approach for improving pump absorption in double clad fibers has been disclosed in U.S. Pat. No. 6,687, 445 B2 where special "truncated regions" or "filaments" are embedded into the fiber cladding (FIG. 3b). The "truncated regions" could be made of glass, air, ceramic, metal or other materials. The "truncated regions" act as scattering centers, which enhance the conversion of "unabsorbable" skew rays to "absorbable" meridian rays. This method has an obvious disadvantage as scattering at the "truncated regions" embedded directly into the cladding will inevitably lead to significant leakage of the pump power out of the fiber. I.e. the method will result in pumping losses.

PURPOSE OF THE INVENTION

The purpose of the present invention is to solve the aforementioned technical problems of the prior-art by providing a new type of active optical fiber structure and a method for fabricating the same.

SUMMARY OF THE INVENTION

The present invention is characterized by what is presented in independent claims 1 and 8.

The section of active optical fiber according to the present invention comprises an active core and an inner cladding layer for propagating pump radiation and having an index of refraction smaller than the index of refraction of the core. The section of active optical fiber further comprises an outer cladding layer around the inner cladding layer. The outer cladding layer has an index of refraction smaller than the index of refraction of the inner cladding layer. According to the present invention the diameter of the core and the thickness of the inner cladding layer change gradually along the length of the section of active optical fiber forming a tapered longitudinal profile and enabling a continuous mode conversion process along the length of the section of fiber. The tapered core supports multimode operation at the thicker end of the section of fiber.

The method for fabricating a section of active optical fiber according to the present invention comprises the steps of fabricating a preform for drawing active optical fiber from the preform in a drawing tower, installing the preform into the drawing tower and drawing optical fiber in the drawing tower altering at least one of the two parameters including the take-off preform speed and the take-up fiber speed during drawing of the optical fiber. This method synthesizes a tapered profile for a section of the active optical fiber.

In one embodiment of the method according to the present invention the diameter of the preform is decreased by pre-drawing the preform prior to drawing the fiber.

In another embodiment of the method according to the present invention the temperature of the preform and the furnace in which the preform resides is altered during the drawing of the fiber. This will lead to a change in the steady state conditions and change the diameter of the fiber.

In yet another embodiment of the method for fabricating a section of active optical fiber according to the present invention the tapered fiber is coated with a polymer coating after exiting the high temperature furnace of the drawing tower.

Pump power may be coupled into the inner cladding of the section of fiber either from one end of the section of fiber or from both ends of the section of fiber.

According to one embodiment of the present invention more than one tapered sections of fiber according to the present invention may reside in sequence to form a biconical or a multiconical section of fiber.

According to another embodiment of the present invention the core at the thinner end of the section of fiber supports single mode operation. The tapered section of active optical fiber can be designed in such a way that the core at the thinner end can support just the fundamental mode, while the core at the thicker end can support multimode operation for the operational wavelength. When the section of fiber is used for light amplification in e.g. a laser or an amplifier, the output radiation will be single mode. Single mode operation is beneficial in e.g. telecommunication applications where dispersion of an optical pulse should be minimized.

In another embodiment of the present invention the core at the thinner end of the section of fiber supports multimode operation. Having a multimode core at the thinner end of the section of tapered fiber has the benefit of e.g. suppressing stimulated Brillouin scattering in the tapered section of fiber, which is especially important when the fiber is used for high power applications. An additional advantage of a multimode fiber output is its large mode field diameter (large cross-sectional core area) facilitating the coupling of the output to other components. The large mode field diameter also results in a higher threshold optical power for the stimulated Brillouin scattering to occur.

In yet another embodiment of the present invention the tapered longitudinal profile of the section of active optical fiber is a linear profile, a power law profile, an exponential profile or a combination of these profiles.

An important feature of the section of active tapered optical fiber according to the present invention is the significantly higher pump-light absorption as compared to active fibers of the prior-art. In addition to the known effect of increased effective optical length, the section of tapered fiber according to the present invention utilizes mode coupling (or mode mixing) which improves pump-light absorption dramatically. In terms of ray optics this can be understood in such a way that the reflection angle of each ray of pump-light propagated through the active tapered section of fiber increases after each reflection from the boundary between the inner cladding and the outer layers of the fiber.

Compared to active optical fibers of the prior-art with single-mode output the thick core at the thicker end of the section of fiber according to the present invention and the tapered profile of the core result in a larger volume of the active core in which the pump-light is able to absorb. This further contributes to the significant increase in pump-light absorption and efficiency of the section of active fiber according to the present invention.

An essential benefit of the structure of the section of active optical fiber according to the present invention is that the structure has a large acceptance aperture for pump-light power at the input and simultaneously significantly improves the absorption of pump-light power into the core as explained above. These properties mitigate or remove the issue of limited power output in state of the art active optical fibers. The large diameter of the thicker end of the section of active optical fiber allows launching pump radiation from high-power low-intensity pump sources with high efficiency into the tapered fiber. For example a pump source with a beam product parameter (BPP) of up to 100-200 mm*mrad may be used. This opens up opportunities for using kilowatt-level semiconductor bar diodes as pump sources for the section of active optical fiber according to the present invention.

In one embodiment of the present invention the outer boundary of the inner cladding layer has a non-circular cross section in the plane perpendicular to the longitudinal direction of the active optical fiber. The core of the section of active optical fiber may also be offset from the middle of the fiber. These properties bring asymmetry to the fiber structure which enriches the modal spectrum as the rays' propagation trajectories become more chaotic. This makes the modal spectrum of the fiber more continuous. As a result, a bigger part of the total pump power is concentrated in the "absorbable" modes of the modal spectrum compared with a circular symmetric fiber.

In another embodiment of the present invention the section of active optical fiber comprises a third cladding layer with a fourth index of refraction around the outer cladding layer. The fourth index of refraction is in this case smaller than the third index of refraction.

In yet another embodiment of the present invention the core of the section of active optical fiber is birefringent. The core has preferably a refractive index difference of bigger than e.g. $5\times10^{-5}$ between the ordinary and extraordinary polarizations. The strong birefringence helps to maintain a stable polarization state at the fiber output.

A tapered fiber with the gradual transformation from the multimode core to a core supporting fewer modes or only a single mode works as a spectral selective optical device. The inherent spectral selectivity results in a significant increase in the efficiency of active devices as only the modes supported by the thinner end of the tapered core (i.e. the modes that are output from the tapered section) are amplified and can be sustained throughout the core. Therefore the bigger volume of the core at the thicker end of the section of fiber is more efficiently used to amplify the wanted output modes.

The active tapered section of fiber according to the present invention also reduces non-linear distortions in high power fiber lasers and amplifiers. Usually non-linear distortions are caused by stimulated Brillouin scattering (SBS), self-phase modulation (SPM) or stimulated Raman scattering (SRS). It is possible to increase the threshold for SBS significantly by using a fiber with a variable core radius. Furthermore, a fiber with large mode diameter (fiber at the thicker end of the tapered section) has a low level of optical power density and is therefore inherently immune to a SPM and SRS.

In light of the previous discussion the tapered section of active optical fiber according to the present invention has several features which all contribute to overcoming the issue of limited pumping efficiency and limited power scaling capability of prior-art active fibers and fiber devices. These issues are even more pronounced in active fibers and devices with single-mode output. The most important beneficial features of the present invention comprise the long optical path of a tapered section of fiber, the continuous mode conversion process, the big core/cladding diameter ratio, the large volume of the active core, the large acceptance aperture for pump-light power at the input and the inherent spectral selectivity. These features together dramatically increase the efficiency and power scaling capability of active optical fiber devices. One application for the present invention is for example an active optical device with single-mode output where the problems of limited pump-light efficiency and limited output power are more pronounced.

BRIEF DESCRIPTION OF THE DRAWINGS

In the following, the present invention will be described in more detail with references to the accompanying schematic figures, in which FIG. 1 (PRIOR ART) shows a pump radiation spectrum as a function of the propagation constant before (dashed line) and after passing through a double clad fiber (solid line), FIGS. 2a to 2f (PRIOR ART) show transverse cross section areas of optical fibers having a core and an inner cladding with an offset core (c) and with a standard circular (a), rectangular (b), octagonal (d), truncated (e) and double truncated (f) inner cladding, FIG. 3a (PRIOR ART) shows a longitudinal cross section of an optical fiber with "truncated regions" embedded into the outer coating, FIG. 3b (PRIOR ART) shows a longitudinal cross section of an optical fiber with "truncated regions" and "filaments" embedded directly into the inner cladding.

DETAILED DESCRIPTION OF THE INVENTION

Figure 4:
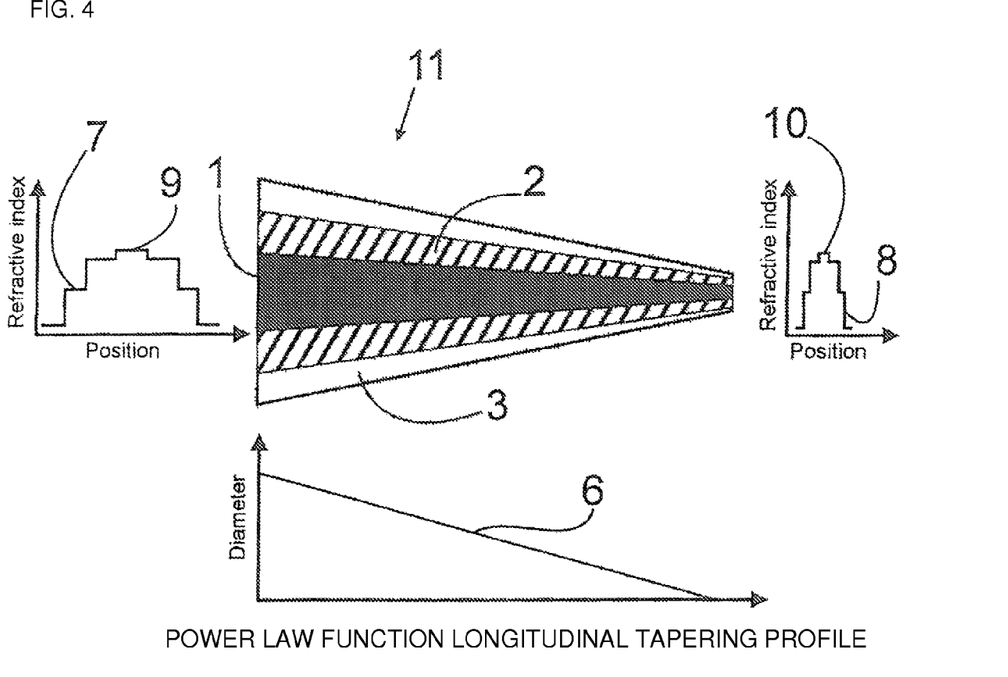
FIG. 4 shows an example of a longitudinal cross section of a section of active double clad tapered fiber, a refractive index profile and a tapering profile according one embodiment of the present invention.

FIG. 4 shows a longitudinal cross section of a tapered section of a double clad active optical fiber 11 according to one embodiment of the present invention. The section of fiber comprises an active core 1, an inner cladding 2 and an outer cladding 3. The figure further shows the tapering profile 6 of the section of fiber. The tapering profile 6 of the outer cladding 3 of the fiber is presented in terms of the diameter of the section of fiber 11 as a function of the position on the section of fiber 11. In the example of FIG. 4 the tapering profile of all of the aforementioned three layers follows a linear function although other profiles may be utilized as well. Considering the method of manufacturing it is feasible to consider an example where all of the layers of the section of fiber have the same functional dependence for their longitudinal profile. Nevertheless according to the present invention only the core 1 and the inner cladding 2 in which the pump power propagates need to be tapered in order for the discussed technical effects to take place.

The diameter of the section of fiber 11 according to the present invention changes along the length of the fiber so that at one end (the thicker end) of the section of fiber the core 1 has a larger diameter and the inner cladding layer 2 is thicker with a very large acceptance aperture for coupling and propagating pump power. The diameter of the section of fiber 11 at this thicker end may be for example up to 2 mm (this currently being the upper limit of the diameter for an optical fiber that is still technically feasible to fabricate) but also bigger diameters could be considered. At the other end (the thinner end) of the tapered section of fiber 11, the core 1 of the fiber has a smaller diameter and the inner cladding 2 for propagating pump power is thinner. Due to tapering, the inner cladding 2 for propagating pump power is thinner at the thinner end so that the tapered profile of the fiber enables a continuous mode conversion process for the pump power.

The core 1 of the section of fiber 11 according to the present invention is active with the active elements in the core 1 emitting light at their characteristic wavelength after excitation with pump-light. The active elements of the core 1 may be e.g. ions of rare-earth elements but also other elements and methods of light emission in the core 1 may be considered.

The refractive index profile of the fiber in FIG. 4 at the thinner end 8 and at the thicker end 7 is shown at the thinner end and at the thicker end of the section of fiber 11, respectively. The refractive index profile for the fiber is a step index profile with the core 1 having the biggest refractive index. The refractive index of the inner cladding 2 is smaller than the one of the core 1 and the refractive index of the outer cladding 3 is smaller than the one of the inner cladding 2. As can be seen from the refractive index profiles the top of the step function is much wider at the thicker end of the fiber 9 than at the thinner end of the fiber 10. This indicates that the section of fiber 11 supports multimode operation at the thicker end while fewer modes or only a single mode are supported at the thinner end of the fiber.

According to an embodiment of the present invention the core 1 at the thinner end of the section of fiber supports single mode operation. This generally corresponds to a value of V<2.405 for the normalized frequency V in step index fibers. The tapered section of active optical fiber 11 can be designed in such a way that the core 1 at the thinner end can support just the fundamental mode, while the core 1 at the thicker end can support multimode operation for the operational wavelength. Hence, the single mode part of the section of active fiber 11 works as a spatial filter guiding the fundamental mode and providing significant losses for higher order modes. Accordingly when the section of fiber 11 is used for light amplification in e.g. a laser or an amplifier, the output radiation will be single mode.

According to another embodiment of the present invention the core 1 at the thinner end of the section of fiber also supports multimode operation, but with a fewer number of modes supported than at the thicker end. Stimulated Brillouin scattering acts as a triggering process for self-Q-switching which occurs during generation (amplification) of high power narrow bandwidth radiation. The chaotic self-Q-switching may impose serious limitations to the power scaling capabilities of fiber lasers and amplifiers in high power operation. Giant pulse appearance resulting from the self-Q-switching may lead to optical discharge in the fiber core destroying the fiber. In order to avoid self-Q-switching it is necessary to suppress SBS arising in the fiber. Broadening of the optical emission line of the fiber can be used for the suppression of SBS. Making the core 1 at the thinner end of the tapered section of fiber 11 to support more than a single mode leads to significant broadening of the optical spectrum in the core 1 compared to the single mode case and, as a result, to efficient suppression of SBS. Also, the threshold optical power for SBS to occur can also be increased by using a core 1 with a large cross-sectional area, and hence a large mode field diameter, characteristic to a multimode fiber, at the thinner end of the section of tapered fiber 11.

A tapered section of fiber 11 with the gradual transformation from the multimode core to a core supporting fewer modes or only a single mode works as a spectral selective optical device. This spectral selectivity has a property of non-reciprocity; spectral selectivity exists just for light propagating from the thicker end towards the thinner end of the section of fiber 11. The tapered section of fiber 11 does not demonstrate any spectral selectivity in the opposite direction. The spectral selectivity can be explained by a combination of intermodal interference in the thicker part of the tapered section and spatial filtering (see above) of a multimode speckle pattern in the thinner part of the tapered section of fiber 11. The inherent spectral selectivity can be used in e.g. single-pass lasers where the narrowing of the linewidth of the laser occurs due to the inherent properties of the tapered section of the fiber 11 according to the present invention. The inherent spectral selectivity results in a significant increase in the efficiency of active devices as only the modes supported by the thinner end of the tapered core 1 (i.e. the modes that are output from the tapered section) are amplified and can be sustained throughout the core 1. Therefore the bigger volume of the core 1 at the thicker end of the section of fiber 11 is more efficiently used to amplify the wanted output modes.

An important feature of the section of active tapered optical fiber 11 according to the present invention is the significantly higher pump absorption as compared to active fibers of the prior-art. As is well known from prior-art, the effective optical length of a tapered fiber is longer compared to the effective optical length of a non-tapered fiber. Consequently the interaction between light and material in the active tapered fiber can be significantly enhanced and the absorption of pump power is increased. In addition to the known effect of increased effective optical length, the section of tapered fiber 11 according to the present invention utilizes mode coupling (or mode mixing) which improves pump-light absorption dramatically. In terms of ray optics this can be understood in such a way that the reflection angle of each ray 4 of pump-light propagated through the active tapered section of fiber 11 increases after each reflection from the boundary between the inner cladding 2 and the outer layers of the fiber.

Figure 5:
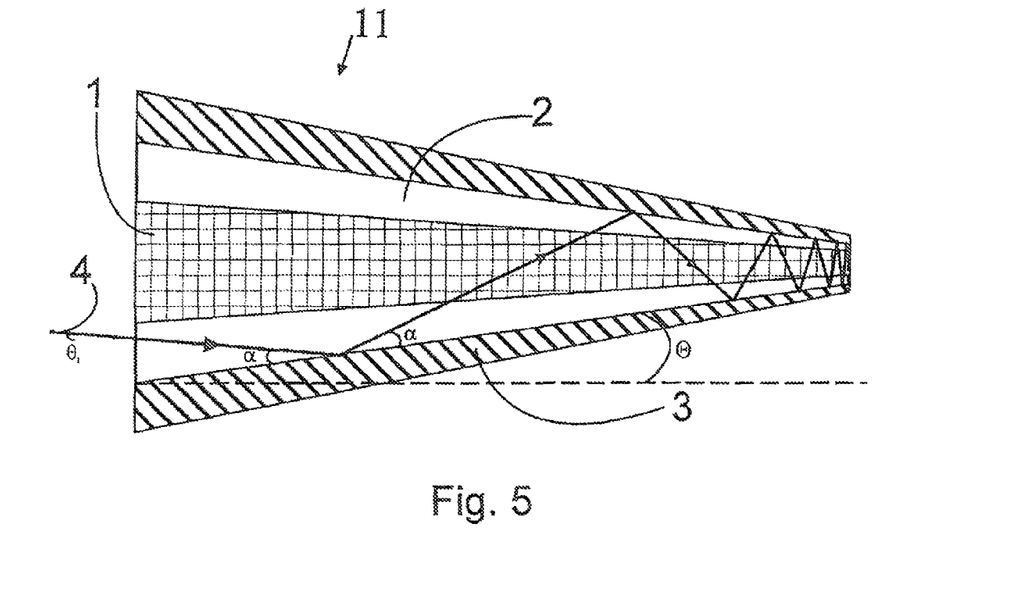
FIG. 5 shows propagation of rays in a longitudinal cross section of a tapered section of fiber according to one embodiment of the present invention.

FIG. 5 shows a longitudinal cross section of a tapered section of a double clad active optical fiber 11 according to one embodiment of the present invention. The figure presents how a ray 4 of pump-light propagates in the section of fiber reflecting from the boundary between the inner cladding 2 and the outer cladding 3. The incident angle $\theta_i$ of the ray 4 on the fiber is smaller than the maximum acceptance angle of the fiber dictated by the numerical aperture NA. The incident angle $\alpha$ of the ray 4 on the boundary between the inner cladding 2 and the outer cladding 3 is obviously same as the reflection angle. Since the reflection boundary is tapered with an angle $\Theta$ the incident angle $\alpha$ on the boundary increases after each reflection as shown by the ray's 4 trajectory in FIG. 5.

In the tapered section of fiber 11 according to the present invention this continuous mode conversion process (i.e. the increase in the reflection angles as explained above) leads to a flow of pump power from "unabsorbable" skew rays confined in the cladding into "absorbable" meridian rays crossing the fiber core 1. As a result, pump power concentrated initially in the skew rays (i.e. in the "unabsorbable" modes) becomes coupled to the "absorbable" modes (i.e. to the meridian rays) after propagation in the tapered section of the fiber. Therefore the pump-light absorption of the active double clad tapered section of fiber 11 is improved by this efficient mechanism of continuous mode conversion.

In one embodiment of the present invention pump-light is coupled to the section of fiber 11 at an angle lower than the maximum angle dictated by the numerical aperture of the fiber. A preferred angle of incidence to the fiber $\theta_i$ is given by the following condition;

$$\frac{n \sin\theta_i}{NA} \leq 0.68,$$

where NA is the numerical aperture of the section fiber 11 and n is the refractive index of the medium from which the pump-light impinges on the fiber. This scheme ensures that the reflection angles of pump-light do not become too high towards the thinner end of the tapered section 11 as the rays of pump-light reflect from the boundary between the inner cladding 2 and the outer layers of the fiber. Too high reflection angles might lead to part of the pump power escaping the fiber which would decrease the efficiency of devices.

Pump power may be coupled into the inner cladding 2 of the section of fiber either from one end of the section of fiber or from both ends of the section of fiber. Furthermore more than one tapered sections of fiber 11 according to the present invention may reside in sequence to form a biconical 12 or a multiconical section of fiber. With the fabrication method according to the present invention the fabrication of such a biconical 12 or multiconical fiber may be realized by alternating the direction of the tapering of the fiber.

Figure 6:
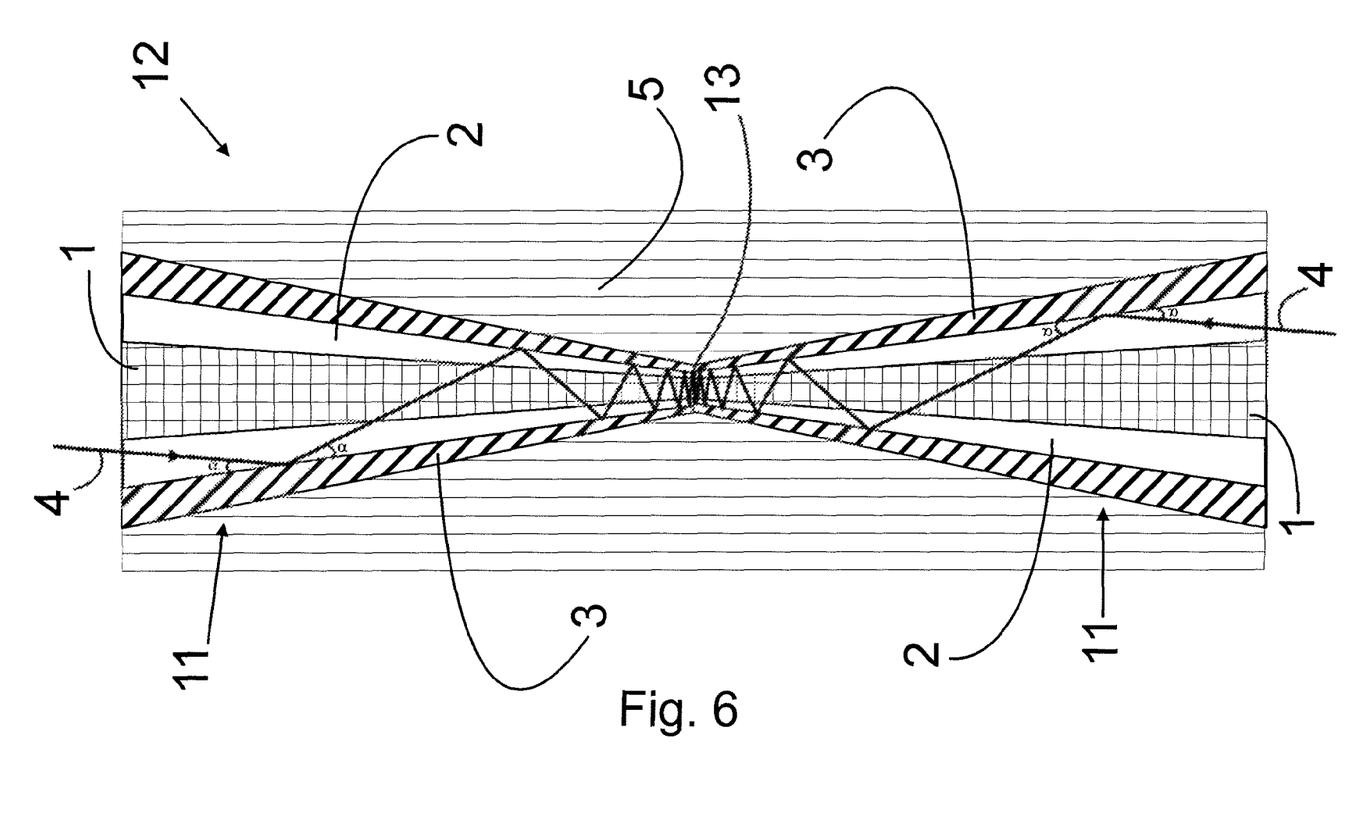
FIG. 6 shows a pumping scheme in a longitudinal cross section of a biconical tapered section of fiber according to one embodiment of the present invention and FIG. 7 shows a flow graph of a method for fabricating the tapered section of active optical fiber according to one embodiment of the present invention.

FIG. 6 shows a longitudinal cross section of a biconical tapered section of active optical fiber 12 according to one embodiment of the present invention comprising two tapered sections of fiber 11. The section of biconical fiber 12 of FIG. 6 further comprises a third cladding layer 5 which is not tapered. The biconical section 12 can be pumped from both ends having a large acceptance aperture as shown by the incident rays of pump light 4. The core at the central part 13 of the biconical section 12 supports fewer modes than the thicker core at the end parts or only a single mode, and therefore the section 12 acts as a spatial filter.

In one embodiment of the present invention the section of active optical fiber 11 comprises a third cladding layer 5 with a fourth index of refraction around the outer cladding layer 3. The fourth index of refraction is in this case smaller than the third index of refraction. This additional cladding layer can provide additional optical confinement and mechanical protection for the inner layers from the environment.

Figure 7:
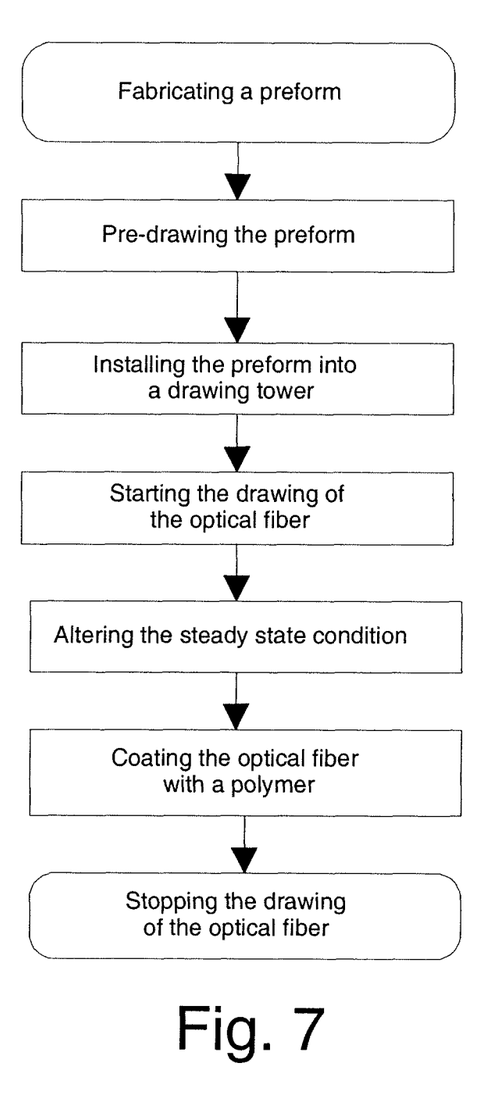

As shown in FIG. 7 the manufacturing of tapered active optical fibers according to one embodiment of the present invention begins from fabricating e.g. a silica or a glass preform doped with e.g. rare earth ions. The preform comprises the doped core and the required cladding structure. The cladding structure can be for example a double clad structure with an outer silica cladding, having a refractive index lower than the refractive index of the core and the first cladding regions. The preform can also have a multi-cladding structure with multiple cladding layers around the core. The shape of the transverse cross section of the preform can be round or a special shape such as a truncated or a double truncated shape depending on the requested shape for the transverse cross-section of the drawn fiber. The preform for active optical fiber can be made with one of the commonly known fabrication methods such as MCVD, OVD, VAD, DND etc.

According to the exemplary embodiment of FIG. 7 the next step in the fabrication method is to decrease the diameter of the preform prior to drawing the fiber in order to reduce the melted volume of the preform during the drawing. This enables shorter sections of tapered fiber to be drawn. The decreasing of the diameter of the preform can be achieved by pre-drawing the preform prior to drawing the fiber. After the pre-drawing step the preform is inserted into a drawing tower comprising a high temperature furnace suitable for melting e.g. silica or glass, a take-off mechanism for moving a preform into the hot zone of the furnace, a take-up mechanism for drawing the fiber and preferably a polymer coating applicator for coating the fiber during the drawing process.

After installing the preform in the drawing tower the drawing of the fiber starts. There exists a simple relation between the take-off speed $V_p$ of the preform and take-up speed $V_f$ of the fiber. For a steady state fiber drawing regime $$V_p \times D_p^2 = V_f \times D_f^2, \quad (2)$$

where $D_p$ and $D_f$ are the diameters of the preform and of the fiber, respectively. This relation can be derived beginning from the assumption that the rate of volume taken off from the preform must be equal to the rate of volume taken up to the fiber.

The next step in the fabrication method of FIG. 7 is to alter the steady state condition. In order to manufacture a tapered fiber the relation (2) should be broken somehow. The most convenient way to do it is to change one or both speeds $V_p$ and $V_f$ simultaneously or separately. For example, if the speed of fiber drawing $V_f$ is increased and $V_p$ is kept constant, the resulting diameter of the fiber will be changed to satisfy the new conditions according to equation (2). The intermediate section of the fiber between two steady state conditions of drawing will have a tapered shape. For the case of increasing $V_f$ the diameter of fiber will decrease. Using the same logic it is straightforward for a person skilled in the art to deduce the behavior of the fiber's diameter in other situations of altering the variables in equation (2). For example another possible way to make tapered sections of fiber is to change the speeds $V_p$ and $V_f$ in opposite directions.

The length of the tapered section of the fiber is determined mainly by two parameters; the thermal inertia of the furnace and the volume of melted preform e.g. silica or glass in the furnace. To make the tapered section of fiber shorter by speeding up the transfer from one steady state condition (as presented by equation (2)) to another it is desirable to have the melted volume of the preform in the hot zone of the furnace as small as possible. The temperature of the furnace in which the preform resides can also be gradually changed during the drawing of the fiber. This will lead to a change in the steady state conditions and change the diameter of the fiber. By altering the temperature of the furnace the dynamics of the transition from one steady state condition to another can also be changed enabling control of the length of the tapered section of fiber.

After the steady state condition has been altered the tapered section of fiber may undergo a polymer coating step after exiting the high temperature furnace of the drawing tower as shown in the embodiment of FIG. 7. The tapered fiber passes through a special applicator and the polymer coating is deposited over the fiber. The fiber is coated with a polymer during the drawing process to protect the inner layers and the core of the fiber. The coating may have a refractive index lower than the refractive index of the claddings of the fiber and in this case the coating also works as an additional low index cladding. The coating may also have a refractive index higher than that of the cladding, and in this case the coating only works as a mechanical preserving coating. The coating can be applied on any kinds of shaped preforms. In contrast to a regular fiber the coating thickness for a tapered fiber may also change to some extent, but this does not affect the optical or the mechanical properties of the tapered fiber. Finally, after the polymer coating has been applied, the drawing of the optical fiber may be stopped.

As is clear for a person skilled in the art, the invention is not limited to the examples described above but the embodiments can freely vary within the scope of the claims.

The invention claimed is:

1. A section of active optical fiber comprising
   a core with a first index of refraction, said core being active,
   an inner cladding layer with a second index of refraction for propagating pump radiation, said second index of refraction being smaller than said first index of refraction and
   an outer cladding layer with a third index of refraction around said inner cladding layer, said third index of refraction being smaller than said second index of refraction,
   wherein the diameter of said core and the thickness of said inner cladding change gradually along the length of said section of active optical fiber forming a tapered longitudinal profile enabling a continuous mode conversion process along the length of the section of fiber and the tapered core supporting multimode operation at the thicker end of the section of fiber, wherein said tapered longitudinal profile of said section of active optical fiber is selected from a group of profiles including a power law profile, an exponential profile and a combination of these profiles.

2. The section of active optical fiber of claim 1 wherein said core of said section of active optical fiber supports single mode operation at the thinner end of the section of fiber.

3. The section of active optical fiber of claim 1, wherein the outer boundary of said inner cladding layer has a non-circular cross section.

4. The section of active optical fiber of claim 1, wherein said core of said section of active optical fiber is offset from the middle of the fiber.

5. The section of active optical fiber of claim 1, wherein said section of active optical fiber comprises a third cladding layer with a fourth index of refraction around said outer cladding layer, said fourth index of refraction being smaller than said third index of refraction.

6. The section of active optical fiber of claim 1, wherein said core of said section of active optical fiber is strongly birefringent, the core having a refractive index difference of greater than $5 \times 10^{-5}$ between the ordinary and extraordinary polarizations.

7. The section of active optical fiber of claim 1, further comprising pump-light coupled to said section of fiber at a angle lower than a maximum angle dictated by numerical aperture of the fiber.

8. A method for fabricating a section of active optical fiber, said method comprising
fabricating a preform for drawing active optical fiber from said preform in a drawing tower,
installing said preform into a drawing tower,
drawing optical fiber in said drawing tower and
altering at least one of the two parameters including the take-off preform speed and the take-up fiber speed during drawing of the optical fiber to synthesize a tapered longitudinal profile for said section of active optical fiber, wherein said tapered longitudinal profile of said section of active optical fiber is selected from a group of profiles including a power law profile, an exponential profile and a combination of these profiles.

9. The method of claim 8 wherein said method, further comprises
coating the optical fiber with a polymer.

10. The method of claim 8 wherein said method further comprises
altering the temperature of said preform to synthesize a tapered profile for said section of active optical fiber.

11. The method of any one of claim 8 wherein said method further comprises the step of
pre-drawing the preform before drawing said active optical fiber.

12. A sequence of sections of active optical fiber wherein said sequence comprises more than one of the sections of active optical fiber according to claim 1 residing in sequence to form a section of fiber.

13. The sequence of sections of active optical fiber of claim 12 wherein a pump-light is coupled to said sequence of sections of active optical fiber from both ends of said sequence.

* * * * *